(12) United States Patent
Goldsmith et al.

(10) Patent No.: US 7,620,940 B2
(45) Date of Patent: Nov. 17, 2009

(54) METHODS AND APPARATUS FOR MONITORING PROGRAM EXECUTION

(75) Inventors: Simon Goldsmith, Berkeley, CA (US); Robert W. O'Callahan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/995,620

(22) Filed: Nov. 23, 2004

(65) Prior Publication Data

US 2006/0117299 A1   Jun. 1, 2006

(51) Int. Cl.
G06F 9/44 (2006.01)
(52) U.S. Cl. .................. 717/127; 717/130; 717/131
(58) Field of Classification Search .................. 717/114, 717/124–133
See application file for complete search history.

(56) References Cited

OTHER PUBLICATIONS

Chanika Hobtr and Brian A. Malloy, "The Design of an OCL Query-Based Debugger for C++", SAC, 2001.*
Thomas Ball, "Efficiently Counting Program Events with Support for On-Line Queries", ACM, 1994.*
Raimondas Lencevicius, Urs Holze, and Ambuj K. Singh, "Query-Based Debugging of Object-Oriented Programs", OOPSLA 1997.*
Lencevicius et al. "Dynamic Query-Based Debugging", 1999, Springer-Verlag Berlin Heidelberg, pp. 135-160.*
Starner, "Some Examples Using the Interval Data Type in the Relational Database Model", 1996, Reliable Computing 2, pp. 373-381.*
Answer.com, "Words—Dictionary: Relational", 1998, The Computer Language Co. Inc., one page.*
January, "Logrind 2—A Program Trace Framework", Jun. 2004, CiteSeerX Beta, pp. 1-79.*
Lencevicius. "Query-Based Debugging", Aug. 1999, Doctor Thesis of University of California, Santa Barbara, pp. i-xiv, 1-140.*
J.C. Corbett et al., "Expressing Checkable Properties of Dynamic Systems: The Bandera Specification Language," International Journal on Software Tools for Technology Transfer, pp. 1-30, Jun. 2001.
M.D. Ernst, "Dynamically Discovering Likely Program Invariants," PhD Thesis, University of Washington, Department of Computer Science and Engineering, 142 pages, 2000.
S. Hangal et al., "Tracking Down Software Bugs Using Automatic Anomaly Detection," Proceedings of the International Conference on Software Engineering, 11 pages, May 2002.
K. Havelund et al., "Synthesizing Monitors for Safety Properties," International Conference on Tools and Algorithms for Construction and Analysis of Systems, (TACAS'02), 15 pages, 2002.
G. Kiczales et al., "An Overview of AspectJ," Lecture Notes in Computer Science, 28 pages, 2001.
M. Kim, "Information Extraction for Run-Time Formal Analysis," PhD Thesis, CIS Dept., University of Pennsylvania, 178 pages, 2001.

(Continued)

Primary Examiner—Ted T Vo
(74) Attorney, Agent, or Firm—Vazken Alexanian; Ryan, Mason & Lewis, LLP

(57) ABSTRACT

A technique for monitoring an execution of a program is provided. At least one relational query is constructed and compiled into a program instrumentation. The program instrumentation is incorporated into the program and one or more query results are output from the program as the program executes.

14 Claims, 2 Drawing Sheets

OTHER PUBLICATIONS

I. Lee et al., "Runtime Assurance Based on Formal Specifications," Proceedings of the International Conference on Parallel and Distributed Processing Techniques and Applications, pp. 1-12, Mar. 1999.

Y. Liao et al., "A Specificational Approach to High Level Program Monitoring and Measuring," IEEE Transactions of Software Engineering, vol. 18, No. 11, pp. 969-978, Nov. 1992.

B. Liblit et al., "Bug Isolation Via Remote Program Sampling," Proceedings of the ACM SIGPLAN 2003 Conference on Programming Language Design and Implementation, pp. 141-154, Jun. 2003.

D. Marinov et al., "Object Equality Profiling," Proceedings of the ACM Conference on Object-Oriented Programing Systems, Languages, and Applications (OOPSLA 2003), pp. 313-325, Oct. 2003.

H.W. Gunther, "WebSphere Application Server Development Best Practices for Performance and Scalability," IBM WebSphere Application Server Standard and Advanced Editions, White Paper, pp. 1-45, Sep. 2000.

D. Drusinsky, "The Temporal Rover and the ATG Rover," Lecture Notes in Computer Science, Proceedings of the 7th International SPIN Workshop on SPIN Model Checking Software Verification, pp. 323-329, 2000.

I. Lee et al., "Runtime Assurance Based on Formal Specifications," Proceedings of the International Conference on Parallel and Distributed Processing Techniques and Applications, pp. 1-12, 1999.

S. Goldsmith et al., "Light-Weight Instrumentation From Relational Queries Over Program Traces," Report No. UCB/CSD-4-1315, Computer Science Division (EECS), University of California, 18 pages, Mar. 2004.

* cited by examiner

METHODS AND APPARATUS FOR MONITORING PROGRAM EXECUTION

FIELD OF THE INVENTION

The present invention is related to techniques for monitoring the execution of a program and, more particularly, techniques for online monitoring through query instrumentation within the program.

BACKGROUND OF THE INVENTION

During the execution of a program it is most desirable to find performance bugs by monitoring the execution and detecting the errors as the program runs. Instrumenting programs with code to monitor their dynamic behavior is a well known technique. Most instrumentation is either incorporated manually by programmers or automatically through the use of specialized tools.

Writing instrumentation code directly into a program is an invasive procedure, and may require the programmer to make changes throughout the program and libraries, thereby polluting the source code. The manual insertion of instrumentation also may require a major effort on the part of the programmer to check complex properties since a low level programming language is often used. Thus, manual instrumentation is labor intensive and results in a code that is more difficult to read and maintain.

Specialized tools, such as tracing and logging infrastructures, capture events in a log database through noninvasive techniques. See, for example, Jinsight and Javinci from IBM Corp. for JAVA™ (Sun Microsystems) applications. After capturing events, the programmer may then query the database. While off-line evaluation of the query allows for a constant sized memory footprint as events are gathered during program execution, the overhead of building and querying a database is higher than that of manual instrumentation techniques.

Research work has also been conducted in instrumentation techniques that allow a programmer to construct queries that may be compiled in code and incorporated into the monitored program. See, for example, D. Drusinsky, "The Temporal Rover and the ATG Rover," Lecture Notes in Computer Science, Proceedings of the 7th International SPIN Workshop on SPIN Model Checking and Software Verification, Springer-Verlag, 2000, pp. 323-329; and I. Lee et al., "Runtime Assurance Based on Formal Specifications," In Proceedings of the International Conference on Parallel and Distributed Processing Techniques and Applications, 1999. The incorporated code checks the desired property of the program as the program runs. However, the query languages are not expressive and require the programmer to identify event generation points, where the instrumentation is to take place.

SUMMARY OF THE INVENTION

The present invention provides techniques for online monitoring of the execution of a program through instrumentation of a relational query within the executing program.

For example, in one aspect of the invention, a technique for monitoring an execution of a program is provided. At least one relational query is constructed and compiled into a program instrumentation. The program instrumentation is incorporated into the program and one or more query results are output from the program as the program executes.

In an additional aspect of the invention, a technique for monitoring the execution of the program further comprises the computing of one or more results online and the resulting maintenance of runtime data tables. One or more instrumentation sites that violate a static predicate of the query and one or more records of evaluated query predicates having a single record are filtered. The recording of irrelevant events in the runtime data tables is prevented, and the records in the runtime data tables that are no longer relevant are discarded.

The techniques of the present invention provide a declarative query language in which the programmer need only specify the requested data. The programmer does not specify how to gather the information, leaving an instrumentation engine to determine efficient data representations and query evaluation plans. Optimizations of the instrumentation engine reduce the time and space overhead of evaluating queries as the program executes.

Advantageously, the present invention provides an expressive and declarative query language. The query is written in one place, making it easier to understand and maintain. Furthermore, the query does not clutter the program. The online processing eliminates post processing steps and provides the quickest feedback, keeping the code-debug cycle short. The program may also be stopped when certain behaviors are detected in the program, and a debugger may be started or a stack trace may be dumped.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for monitoring the execution of a program and, more particularly, techniques for online monitoring through relational query instrumentation within the program. The phrase "relational query," as used herein, is intended to illustratively include a query that cross-references two or more tables commonly stored in a database. The term "online," as used herein, is intended to illustratively include a status which demonstrates a processing conducted directly through a currently executing program. The term "offline," as used herein, is intended to illustratively include a status which demonstrates a processing conducted outside of a currently executing program. The term "instrumentation," as used herein, is intended to illustratively include code incorporated into a program in order to adapt the program to provide a specific result. Finally, the phrase "instrumentation site," as used herein, is intended to illustratively include the locations in the program where the instrumentation is inserted.

Figure 1:
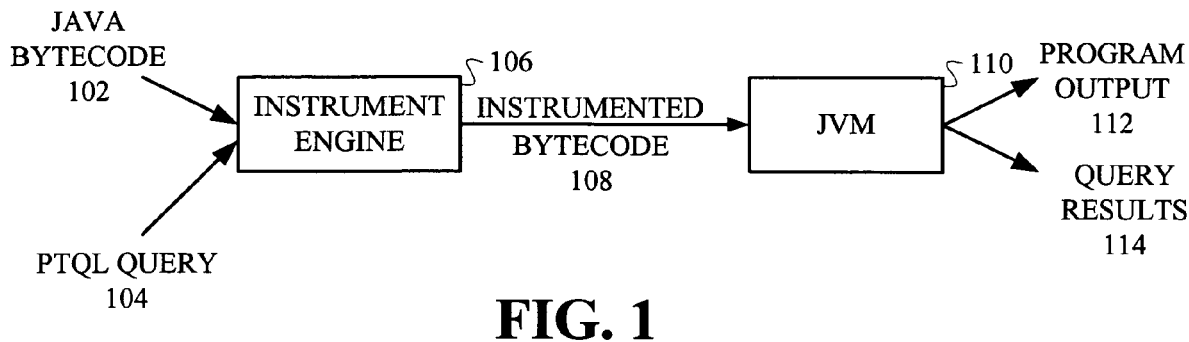
FIG. 1 is a block diagram illustrating the insertion of a query instrumentation into a program, according to an embodiment of the present invention.

Referring initially to FIG. 1, a block diagram illustrates the insertion of a relational query instrumentation into program, according to an embodiment of the present invention. The block diagram of FIG. 1 illustrates a specific embodiment of the present invention utilizing a program trace query language (PTQL), JAVA™, and an instrumentation engine. JAVA™ byte code 102 and a PTQL query 104 are fed into an instrumentation engine 106.

PTQL query 104 may seek to determine, for example, whether a program performs a certain function, how many times the program performs this function, or how long the program takes to perform a specific function. A program trace is a set of time stamped program execution events. When an event occurs in the executing program, a record of the event is stored in either a method invocation table or an object allocation table. The content included in a method invocation record may include a method name, an implementation class, a declaring class, a start time, an end time, a receiver, a thread, a parameter and a result. Content of an object allocation record may include an allocation time, a collection time and a dynamic type. The properties of the program requested by the query lie in the correlation or combination of two or more of these records.

PTQL query 104 may be considered a relational query, which consists of three clauses: a FROM clause, a WHERE clause, and a SELECT clause. Query results are drawn from the Cartesian product of the relations in the FROM clause. Let z be a tuple from this Cartesian product. The identifiers in the FROM clause give each position in z a unique name. Using these names, the WHERE clause gives predicates that z must satisfy if it is to be included in query results. Finally, the SELECT clause specifies the fields from z to be output with each query result.

A general syntax of PTQL is described as follows:

| <query> | ::= | SELECT <selectitem> [, <selectitem>]* FROM <fromitem> [, <fromitem>]* WHERE<whereitem> [AND <whereitem>]* |
|---|---|---|
| <selectitem> | ::= | identifier.field |
| <fromitem> | ::= | <relation> identifier |
| <whereitem> | ::= | identifier.field <op> identifier.field |
|  | \| | identifier.field = 'string' |
| <relation> | ::= | MethodInvocation \| ObjectAllocation |
| <op> | ::= | < \| = \| != \| > |

As a specific example of a relational query, for each call to methods named y declared in class Foo, the following query returns a result containing the first two actual parameters of the call:

| SELECT | Y.param0, Y.param1 |
|---|---|
| FROM | MethodInvocation Y |
| WHERE | Y.methodName = 'y' |
| AND | Y.declaringClass = 'Foo' |

Returning now to FIG. 1, within instrumentation engine 106, PTQL query 104 is transformed into instrumented bytecode 108 through the use of JAVA™ bytecode 102. Instrumented bytecode 108 is output from instrumentation engine 106 and input to a program executing on a JAVA™ virtual machine (JVM) 110. Instrumentation engine 106 must instrument the program to gather records that match the various events specified in PTQL query 104. For each event, instrumentation engine 106 must include instrumentation to record the fields PTQL query 104 specifies. For example, a baseline for instrumentation to gather method invocations is as follows:

```
Object method(Object arg0, Object arg1) {
    get global lock;
    MethodDescriptor mdescr = new MethodDescriptor(
        this,
        array of arguments to method,
        statistically determined method id for method
    );
    add mdescr to runtime tables;
    release gloal lock;
    /* method may terminate with an exception */
    try {
        method body
        store return value in retval;
    } catch (Throwable e) {
        /* end-of-method code for exception case */
        get global lock;
        mdescr.setEndTimeExceptionResult ( );
        release global lock;
        throw e; /* rethrow e */
    }
    /* end-of-method code for regular termination */
    get global lock;
    mdescr.setEndTimeAndResult (returnValue)
    release global lock;
    return retval;
}
```

This instrumentation is thread safe in that operations on shared data structures are protected by a global lock. At the start of the method, this instrumentation records the start time (field startTime), thread (thread), actual parameters (param0 and param1) and this pointer (receiver). At the end, it records the return value (result) and end time (endTime).

As a result of the instrumentation, the executing program on JVM 110, outputs its standard program output 112 as well as query results 114.

Figure 2:
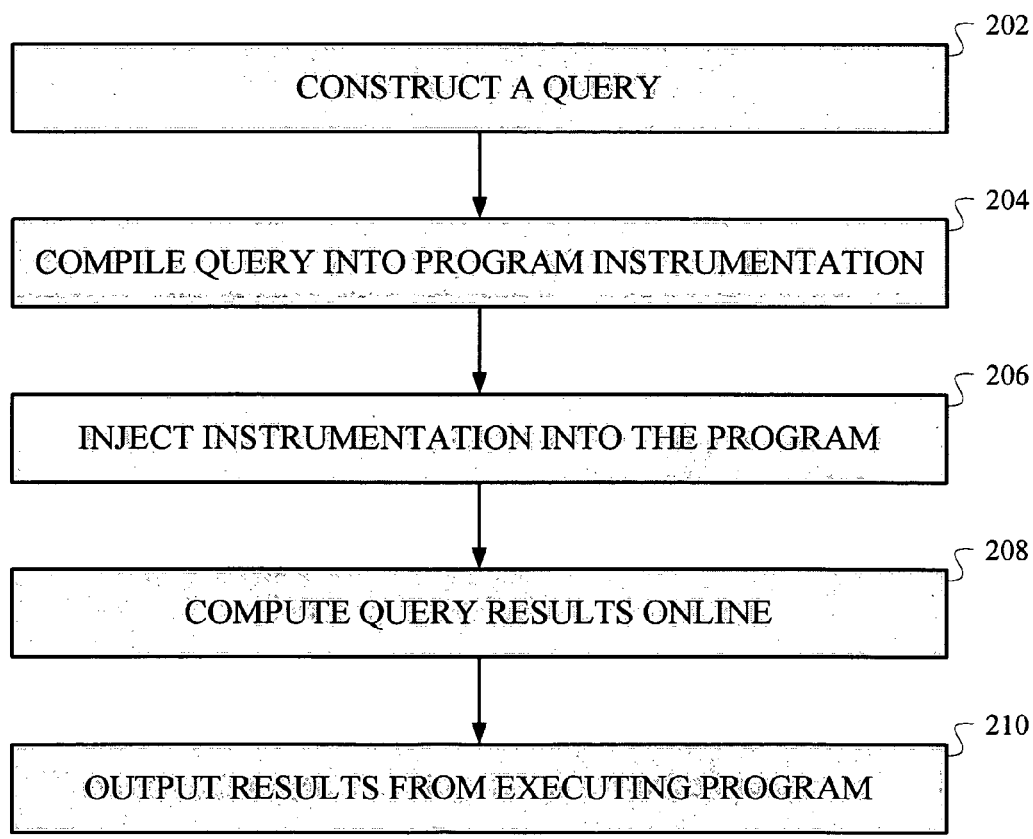
FIG. 2 is a flow diagram illustrating a program monitoring methodology, according to an embodiment of the present invention.

Referring now to FIG. 2, a flow diagram illustrates a program monitoring methodology, according to an embodiment of the present invention. In block 202, a query is constructed. In a preferred embodiment, the query is constructed in PTQL, as described above, allowing the query to be more expressive, while also declarative. More specifically, the query specifies the requested data without specifying where to search for the requested data. The query is constructed as a relational query for implementation over a database, more specifically, a program execution event database. However, no offline database is utilized in the methodology.

In block 204, the query is compiled into a lightweight instrumentation. The instrumentation is designed for insertion into the program so that query results are provided as the program executes. The online query evaluation presents a simpler model to the user than that of offline query evaluation by eliminating post-processing steps. Online evaluation also provides the quickest feedback, keeping the code-debug cycle short.

An online instrumentation engine is utilized to compile the query into the instrumented code. The engine is designed to handle recursion, threads and exceptions. The query instrumentation is preferably written in an object oriented programming language such as JAVA™, as described above. This creates reentrancy issues, which are resolved by avoiding the use of most JAVA™ library classes and refusing to instrument those library classes that are used.

In block 206, the instrumentation is incorporated into the program, preferably at a level of the byte codes of the executing program. The instrumentation engine determines which record fields of the program are proper for instrumentation through an analysis of the query. The engine incorporates the instrumentation to gather records that match the various events specified in the query. In practice, many records never need to be generated and many fields never need to be set, leading to optimizations that will augment, change or discard instrumentations according to a given situation.

In block 208, the query results are computed online. For example, an instrumentation may be configured to gather method invocations, as described above. The computation of results online necessitates a memory for the storage of this intermediate data. The instrumentation engine provides runtime data tables that store event records that potentially satisfy the predicates associated with a query, until query evaluation. One runtime data table is kept per identifier pair in the FROM clause of the query. The data gathering instrumentation creates records and adds them to suitable runtime data tables.

A runtime data table must support the operations of adding a record, updating fields of a record, joining a record to a query result, checking for the existence of a record that satisfies a predicate of the query, and deleting a record. The maintenance of the runtime data table is also performed as an optimization of the stored intermediate or temporary data from the executing program, as will be described in FIG. 3 below. This optimization is utilized to minimize the amount of data that is stored in the runtime data table and the duration that the data is stored in the runtime data table. In other words, the optimization of the runtime data table seeks to discard results as early as possible.

Finally, in block 210, the query results are output from the executing program. Due to the computation of query results online, the query results may be output incrementally, and errors may be detected as the program runs. If not output incrementally, intermediate runtime data tables may become too large or grow without bound. An analysis conducted by the engine determines when to output results for a specific event by determining that no future records will arrive which could combine with a record for the event to produce a valid query result. Standard results produced by the program may be continuously output as well.

Figure 3:
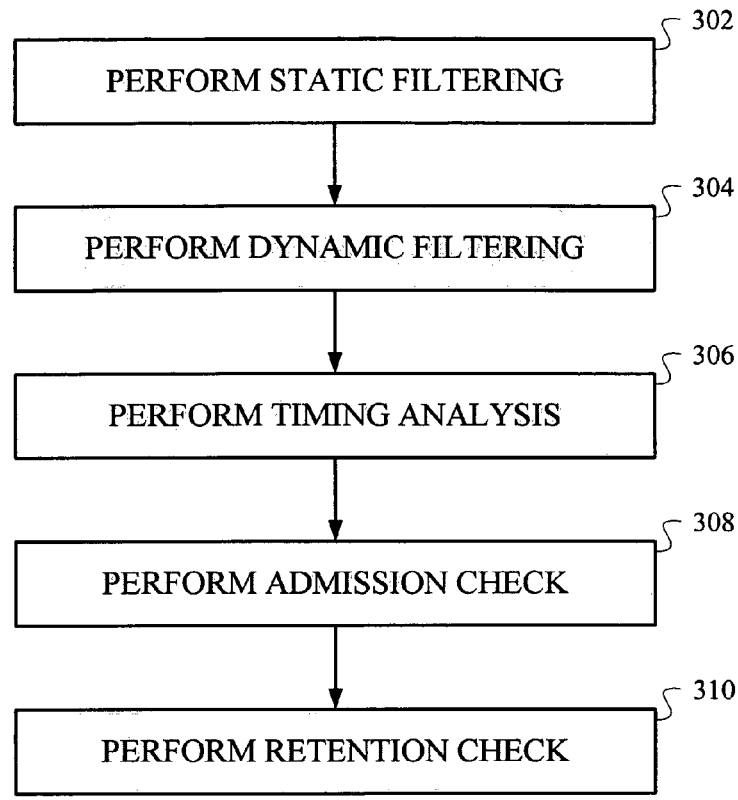
FIG. 3 is a flow diagram illustrating an optimization methodology for computing query results online, according to an embodiment of the present invention.

Referring now to FIG. 3, a flow diagram illustrates an optimization methodology for maintaining runtime data tables in computing query results online, according to an embodiment of the present invention. This may be considered a detailed description of block 208 in FIG. 2. In block 302, instrumentation sites may be filtered when predicates in the query depend only on static properties of the code, referred to as static predicates. This may be considered static filtering. If an instrumentation site violates a static predicate of a query, the instrumentation engine need not incorporate instrumentation at that site. The predicates that the instrumentation engine uses in this way are comparisons of the method name, declaring class and implementing class fields in method invocation records with constant strings, and comparisons of the dynamic type field in object allocation records with constant strings.

The optimization is straightforward to implement at method invocation instrumentation sites, because the method name, defining class and implementing class are all apparent from the method being instrumented. Static filtering on dynamic type is only possible at sites where enough is known about the static type of the object reference in question, and enough is known about the program's class hierarchy, to statically determine whether the object reference refers to an object of the desired class. To support these decisions, the instrumentation engine builds a partial class hierarchy based on the code available at instrumentation time, making conservative approximations for unknown code.

In block 304, dynamic filtering is performed. Query predicates that involve only one record can be evaluated at the instrumentation site that sets the relevant fields of that record, referred to a simple dynamic predicates. If fields necessary to evaluate a simple dynamic predicate of a query are not available when the record is generated, the record is added to the runtime data tables. When the missing fields become available, the predicate of the query is evaluated. In either case, if the predicate of the query fails the evaluation, the record is removed.

In block 306, a timing analysis is performed. Timing analysis computes information about the ordering of events in a query result and stores it as a timing graph. The timing analysis determines where and when to perform admission and retention checks, and when enough information has been gathered to output a result, which may also lead to the deletion of records.

In block 308, an admission check is performed, which checks and prunes the runtime data tables by preventing the recording of irrelevant events. Query predicates that cannot be evaluated statically and that involve more than one record are referred to as join predicates. The instrumentation engine adds instrumentation (an admission check) to check join predicates when new records are created. A record is denied admission to a runtime data table if it cannot possibly satisfy a join predicate of a query. Admission checks may be incorporated at each instrumentation point (i.e., a start or end event).

In block 310, a retention check is performed. The retention check is similar to an admission check in that it checks and prunes the runtime data tables by discarding records when they are no longer relevant. A retention check is performed at the end of the method invocation (or object lifetime), when the result is known.

In order to provide a specific example of an illustrative embodiment of the present invention, consider the following program fragment:

```
public class DB {
    B b;
    void doTransaction( ) {
        b.y( );
    }
}
public class B {
    void y( ) {
        sleep( );
    }
    void sleep( ) { }
}
```

Expressing the question, "Can method DB.doTransaction( ) transitively call method sleep( )?", in PTQL results in the following:

| | |
|---|---|
| SELECT | doTrans.startTime, sleep.startTime |
| FROM | MethodInvocation doTrans, |
| | MethodInvocation sleep |
| WHERE | doTrans.methodName = 'doTransaction' |
| AND | doTrans.declaringClass = 'DB' |
| AND | sleep.methodName = 'sleep' |

| | |
|---|---|
| AND | sleep.declaringClass = 'B' |
| AND | doTrans.thread = sleep.thread |
| AND | doTrans.startTim < sleep.startTime |
| AND | slee.endTime < doTrans.endTime |

This PTQL query is looking for two method invocations, doTrans and sleep, where doTrans is a method named doTransaction defined in class DB and sleep is a method named sleep defined in class B. Furthermore, doTrans and sleep should happen in the same thread and sleep should happen during doTrans.

The PTQL query requires two runtime data tables: xs for MethodInvocation doTrans and zs for MethodInvocation sleep. The following are static predicates:

| | |
|---|---|
| | doTrans.methodName = 'doTransaction' |
| AND | doTrans.declaringClass = 'DB' |
| AND | sleep.methodName = 'sleep' |
| AND | sleep.declaringClass = 'B' |

Based on these static predicates only DB.doTransaction( ) needs to be instrumented to add records to xs and only sleep( ) needs to be instrumented to add records to zs.

Therefore, the resulting optimized instrumented code is as follows:

```
public class A {
    B b;
    //...
    void doTransaction( ) {
        get global lock;
        MethodDescriptor X = new MethodDescriptor(
            this,
            null, /* no arguments */
            1 /* method id for doTransaction */
        );
        xs.add(X);
        release global lock;
        try {
            b.y( );
        } catch (Throwable e) {
            get global lock;
            xs.delete(X);
            release global lock;
            throw e;
        }
        get global lock;
        xs.delete(X);
        release global lock;
    }
}
public class B {
    //...
    void y( ) { //method y is unchanged
        sleep( );
    }
    Void sleep( ) {
        get global lock;
        MethodDescriptor Z = new MethodDescriptor(
            this,
            null, /* no arguments */
            2 /* method id for sleep */
        );
```

```
        output query results for Z;
        release global lock;
    }
}
```

The instrumentation at the start of sleep( ) creates a record, Z, and then computes and outputs query results involving Z; that is for each record X in xs with X.thread=Z.thread, output (X.startTime, Z.startTime). The timing constraints need not be checked at query evaluation since they are always satisfied (records in xs are for calls to DB.doTransaction( ) that have started, but not completed.) Since all query results involving Z are output at the start of sleep( ), Z need not be recorded. In fact, no table zs is actually necessary. Since zs is always empty, the retention check at the end of DB.doTransaction( ) will always fail. The instrumentation at the end of DB.doTransaction( ) removes the record from xs.

Figure 4:
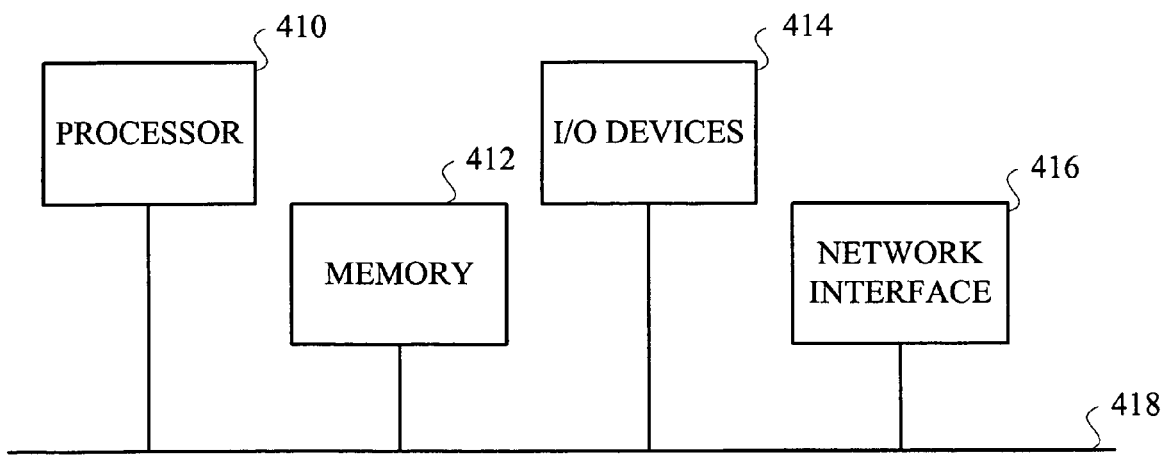
FIG. 4 is a diagram illustrating an illustrative hardware implementation of a computing system in accordance with which one or more components/methodologies of the present invention may be implemented, according to an embodiment of the present invention.

Referring now to FIG. 4, a block diagram illustrates an illustrative hardware implementation of a computing system in accordance with which one or more components/methodologies of the invention (e.g., components/methodologies described in the context of FIGS. 1-3) may be implemented, according to an embodiment of the present invention. For instance, such a computing system in FIG. 4 may implement the instrumentation engine and the executing program of FIGS. 1-3.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering data to the processing unit, and/or one or more output devices for presenting results associated with the processing unit. JAVA™ byte code 102, query 104, program output 112 and query results 114 may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of monitoring an execution of a program comprising the steps of:
   maintaining a program execution event database comprising a plurality of runtime data tables, each runtime data table comprising one or more records, each of the plurality of runtime data tables corresponding to a respective method or object such that the records within a given runtime data table represent respective invocations of the corresponding method or respective allocations of the corresponding object;
   constructing at least one relational query, wherein the at least one relational query correlates at least one record within each of two or more of the plurality of runtime data tables;
   compiling the at least one relational query into a program instrumentation;
   incorporating the program instrumentation into the program, wherein the program is in an executable form;
   obtaining one or more query results based on the at least one relational query and the program execution event database; and
   outputting one or more query results from the program as the program executes;
   wherein at least the maintaining, compiling, incorporating, obtaining and outputting steps are performed by one or more processors operatively coupled to one or more memories for storing the program execution event database and the program; and
   wherein the step of maintaining a program execution event database comprising a plurality of runtime data tables comprises the steps of:
   filtering one or more instrumentation sites that violate a static predicate of the query;
   filtering one or more records of at least one evaluated predicate of a query having a single record;
   preventing the recording of irrelevant events at the runtime data tables; and
   discarding records from the one or more runtime data tables that are no longer relevant from the runtime data tables.

2. The method of claim 1, wherein, in the step of constructing at least one relational query, the at least one relational query is constructed in a program trace query language.

3. The method of claim 1, wherein, in the step of compiling the at least one relational query into a program instrumentation, the program instrumentation is written in an object oriented programming language.

4. The method of claim 1, wherein the step of incorporating the program instrumentation into the program comprises the step of instrumenting at a byte code level of an object oriented programming language.

5. The method of claim 1, wherein the step of incorporating the program instrumentation into the program, comprises the step of analyzing the at least one query to determine one or more event generation points of the program for instrumentation.

6. The method of claim 1, further comprising the step of computing one or more query results online as the program executes.

7. The method of claim 1, wherein, in the step of outputting one or more query results, the computed results are output incrementally.

8. The method of claim 1, wherein the step of outputting one or more query results, comprises the step of determining whether future records will arrive that will produce a valid query result.

9. Apparatus for monitoring an execution of a program, comprising:
   a memory; and
   at least one processor coupled to the memory and operative to: (i) maintain a program execution event database comprising a plurality of runtime data tables, each table comprising one or more records, each of the plurality of runtime data tables corresponding to a respective method or object such that the records within a given runtime data table represent respective invocations of the corresponding method or respective allocations of the corresponding object; (ii) construct at least one relational query, wherein the at least one relational query correlates at least one record within each of two or more of the plurality of runtime data tables; (iii) compile the at least one relational query into a program instrumentation; (iv) incorporate the program instrumentation into the program, wherein the program is in an executable form; (v) obtain one or more query results based on the at least one relational query and the program execution event database; and (vi) output one or more query results from the program as the program executes;
   wherein the operation of maintaining a program execution event database comprising a plurality of runtime data tables comprises the operations of:
   filtering one or more instrumentation sites that violate a static predicate of the query;
   filtering one or more records of at least one evaluated predicate of a query having a single record;
   preventing the recording of irrelevant events at the runtime data tables; and
   discarding records from the one or more runtime data tables that are no longer relevant from the runtime data tables.

10. The apparatus of claim 9, wherein the operation of incorporating the program instrumentation into the program, comprises the operation of analyzing the at least one query to determine one or more event generation points of the program for instrumentation.

11. The apparatus of claim 9, further comprising the operation of computing one or more query results online as the program executes.

12. The apparatus of claim 9, wherein, in the operation of outputting one or more query results, the computed results are output incrementally.

13. The apparatus of claim 9, wherein the operation of outputting one or more query results, comprises the operation of determining whether future records will arrive that will produce a valid query result.

14. An article of manufacture for monitoring an execution of a program, comprising a machine readable storage medium containing one or more programs which when executed implement the steps of:
   maintaining a program execution event database comprising a plurality of runtime data tables, each runtime data table comprising one or more records, each of the plurality of runtime data tables corresponding to a respective method or object such that the records within a given runtime data table represent respective invocations of the corresponding method or respective allocations of the corresponding object;

constructing at least one relational query, wherein the at least one relational query correlates at least one record within each of two or more of the plurality of runtime data tables;

compiling the at least one relational query into a program instrumentation;

incorporating the program instrumentation into the program, wherein the program is in an executable form;

obtaining one or more query results based on the at least one relational query and the program execution event database; and outputting one or more query results from the program as the program executes;

wherein the step of maintaining a program execution event database comprising a plurality of runtime data tables comprises the steps of:

filtering one or more instrumentation sites that violate a static predicate of the query;

filtering one or more records of at least one evaluated predicate of a query having a single record;

preventing the recording of irrelevant events at the runtime data tables; and discarding records from the one or more runtime data tables that are no longer relevant from the runtime data tables.

* * * * *

UNITED STATES PATENT AND TRADEMARK OFFICE
CERTIFICATE OF CORRECTION

| | |
|---|---|
| PATENT NO. | : 7,620,940 B2 |
| APPLICATION NO. | : 10/995620 |
| DATED | : November 17, 2009 |
| INVENTOR(S) | : Goldsmith et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this

Twenty-sixth Day of October, 2010

David J. Kappos
*Director of the United States Patent and Trademark Office*